United States Patent [19]

Prinsen

[11] Patent Number: 5,825,347
[45] Date of Patent: Oct. 20, 1998

[54] PHYSICAL/ELECTRONIC IMAGE DEPICTION APPARATUS AND METHOD

[75] Inventor: Christopher Alen Prinsen, Minneapolis, Minn.

[73] Assignee: DS Partners, Inc., Minneapolis, Minn.

[21] Appl. No.: 668,421

[22] Filed: Jun. 17, 1996

[51] Int. Cl.⁶ .................................................. G09F 7/12
[52] U.S. Cl. .................. 345/112; 248/918; 348/836; 463/30
[58] Field of Search ................ 348/836; 463/30–47; 434/257–261; 248/917, 918, 442.2; 40/594

[56] References Cited

U.S. PATENT DOCUMENTS

| 5,072,998 | 12/1991 | Oh . | |
| 5,398,905 | 3/1995 | Hinson | 248/442.2 |
| 5,464,214 | 11/1995 | Griffin . | |
| 5,564,209 | 10/1996 | Zagnoli | 40/594 |

OTHER PUBLICATIONS

Berkeley Systems, "Screenies", Brochure, 1994.

*Primary Examiner*—Steven J. Saras
*Assistant Examiner*—Vincent E. Kovalick
*Attorney, Agent, or Firm*—Merchant, Gould, Smith, Edell, Welter & Schmidt, P.A.

[57] ABSTRACT

A system for depicting a complete image from a plurality of partial images is provided. A set of one or more physical objects are positioned on at least one side of a display device. Each of the physical objects represents a different discrete portion of a complete image, each discrete portion creating a continuous visual image with a remaining portion of the image. The display device displays the remaining portion of the image as a visual representation on a display screen. At least a portion of the visual representation portrays a visual extension of one or more of the physical objects. The visual representation on the display screen, the visual extensions, and the set of one or more physical objects together define the complete image. A method implemented by the system for providing the complete image is also provided.

35 Claims, 4 Drawing Sheets

PHYSICAL/ELECTRONIC IMAGE DEPICTION APPARATUS AND METHOD

FIELD OF THE INVENTION

The present invention relates generally to visual entertainment and amusement devices. More particularly, the present invention relates to an interactive combination of one or more physical images and an electronic image to form a single cooperative image.

BACKGROUND OF THE INVENTION

As modern technology becomes more advanced, society is ever-increasingly finding itself face to face with video picture tubes, such as cathode ray tubes (CRT) television screens, and particularly computer monitors. This trend is likely to continue, particularly in light of the advent of digital television and other digital imaging techniques. These video display screens are often unattractive, or tend to intimidate the user due a technological nature. It is therefore not uncommon for people with these video display screens to obtain a higher comfort level when using such devices. In fact, the personalization of such video display screens and computer monitors has given rise to creative forms of amusement.

One such device is described in U.S. Pat. No. 5,464,214 issued on Nov. 7, 1995 to Griffin. Griffin discloses a three dimensional amusement device for transforming the outer appearance of a video terminal, thereby enhancing its appeal and improving the state of mind of the person using the terminal. The device includes a stretchable skirt structure that can be mounted to the video display screen, having a three dimensional object supported by the stretchable skirt structure. In one embodiment, a flexible skirt structure is stretched over the video display screen which surrounds the viewing area to form the should portion of a monkey. The flexible skirt structure then supports a three dimensional head of the monkey. Such a device uses the physical structure of the computer monitor as a portion of the body of the monkey. However, only the physical structure and shape of the monitor becomes part of the image, and whether the computer monitor displays an image is irrelevant.

Another such device is described in U.S. Pat. No. 5,072,998 issued on Dec. 17, 1991 to Oh. Oh discloses the use of stuffed anatomical members from mounting on a computer monitor to make the monitor less intimidating to children to encourage its use by children. The stuffed anatomical members may include a head, arm members, feet members, or other anatomical parts. Each member can be attached to the monitor using fasteners. However, as in the Griffin reference, it is the physical structure of the computer monitor that cooperates with the other physical elements.

Yet another such device is commercially available under the trade name of Screenies®. A physical border is provided to attach to and surround the monitor. One particular Screenie® is marketed as a "Computer Aquarium Screen Saver & Screenie®", which includes a border illustrating cats looking into a fish aquarium. A screen saver provided by Berkeley® Systems After Dark™ displays fish swimming in the aquarium. However, such a system does not provide the visual connection as in the present invention. The present invention includes a display on the display device where at least a portion of the visual representation on the display device is a visual "extension" of the physical object. The total image provided takes on a greater continuity where the physical object is electronically projected into the monitor display.

It is therefore desirable to provide an amusement or entertainment device where not only the physical structure of a video display or computer monitor is used, but rather where an image generated on the display of the video display or computer monitor interacts with external physical objects to create a single cooperative image. The image on the display is visually linked to the physical objects where at least one of the physical objects includes an extension which is electronically depicted as part of a total visual representation on the display. This takes advantage of what the video display or computer monitor was designed for, namely displaying an image. Video display screens and computer monitors are capable of displaying nearly any image imaginable, which allows a countless number of different cooperative images to be depicted. Furthermore, an electronic depiction on a computer monitor, video screen or television has the great advantage of moveable, or animated screen images which makes a single cooperative image more entertaining to view.

The present invention provides a solution to the problems associated with the prior art, and offers these and other advantages over the prior art.

SUMMARY OF THE INVENTION

The present invention relates to an interactive combination of one or more physical images and an electronic image to form a single cooperative image.

In accordance with one embodiment of the invention, a set of one or more physical objects are positioned on at least one side of a display device. Each of the physical objects represents a different discrete portion of a complete image, each discrete portion creating a continuous visual image with a remaining portion of the image. The display device displays the remaining portion of the image as a visual representation on a display screen. At least a portion of the visual representation is a visual extension of one or more of the physical objects. The visual representation on the display screen, the visual extension, and the set of one or more physical objects together define the complete cooperative image.

In accordance with another embodiment of the invention, a method for depicting an image in a system having a monitor coupled to a computer is provided. One or more physical objects are positioned on at least one side of the monitor, where each physical object represents a different discrete portion of the image. A remaining portion of the image is displayed as a visual representation on a display of the monitor. Each discrete portion of the image represented by the physical objects is visibly connected to the visual representation on the display of the monitor to cooperatively create the image. At least a portion of the visual representation on the display of the monitor is an electronic extension of one or more of the physical objects.

These and various other features as well as advantages which characterize the present invention will be apparent upon reading and review of the following detailed description and associated drawings.

DETAILED DESCRIPTION

Figure 1:
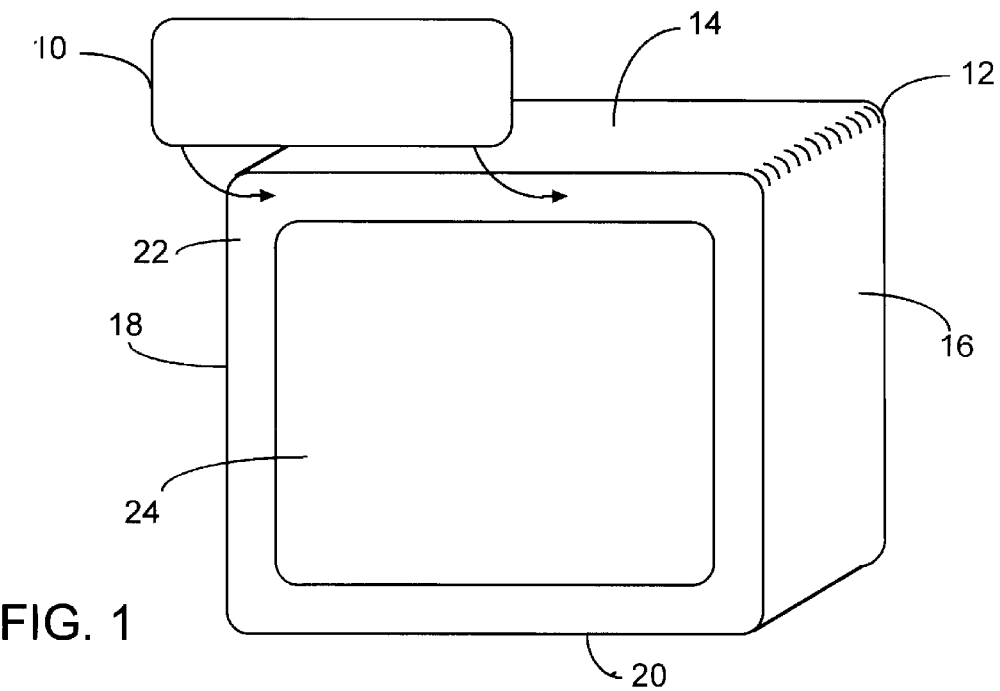
FIG. 1 illustrates the positioning of a two-dimensional object on a display device.

FIG. 1 illustrates the positioning of a two dimensional (2-D) object 10 on a display device 12. The 2-D object 10 is representative of any substantially two-dimensional object. The 2-D object 10 can be positioned on any side of the display device 12. Display device 12 of FIG. 1 has a top side 14, a right side 16, a left side 18, a bottom side 20, and a front side 22. The 2-D object 10 can be positioned on any one or more of these sides. In FIG. 1, the 2-D object 10 is positioned on the front side 22 of the display device 12 near the top side 14. The 2-D objects 10 may or may not overlap the display screen 24 which will be used to display the remaining portion of a complete image.

The 2-D object can be made to have any shape, color, size, pattern, or design to form a portion of the desired complete image. The 2-D object 10 can be positioned on any of the sides of the display device 12 by any method known in the art including adhesives and hook and loop fasteners. Objects can be positioned on a substantially horizontal side by means of gravity.

The display device 12 shown in FIG. 1 represents any device capable of depicting an electronic image. These devices include video monitors, computer monitors, and other cathode ray tubes (CRTs) such as a television. Display device 12 can also represent display devices which do not include CRTs, such as liquid-crystal displays (LCDs).

The two dimensional object 10 represents a portion of a complete image. The complete image is partially depicted by one or more two dimensional objects 10, and the remaining portion of the complete image is displayed on the display screen 24 of the display device 12. Any number of the 2-D objects 10 can be used in conjunction with the image displayed on the display screen 24 to create the complete image.

Figure 2:
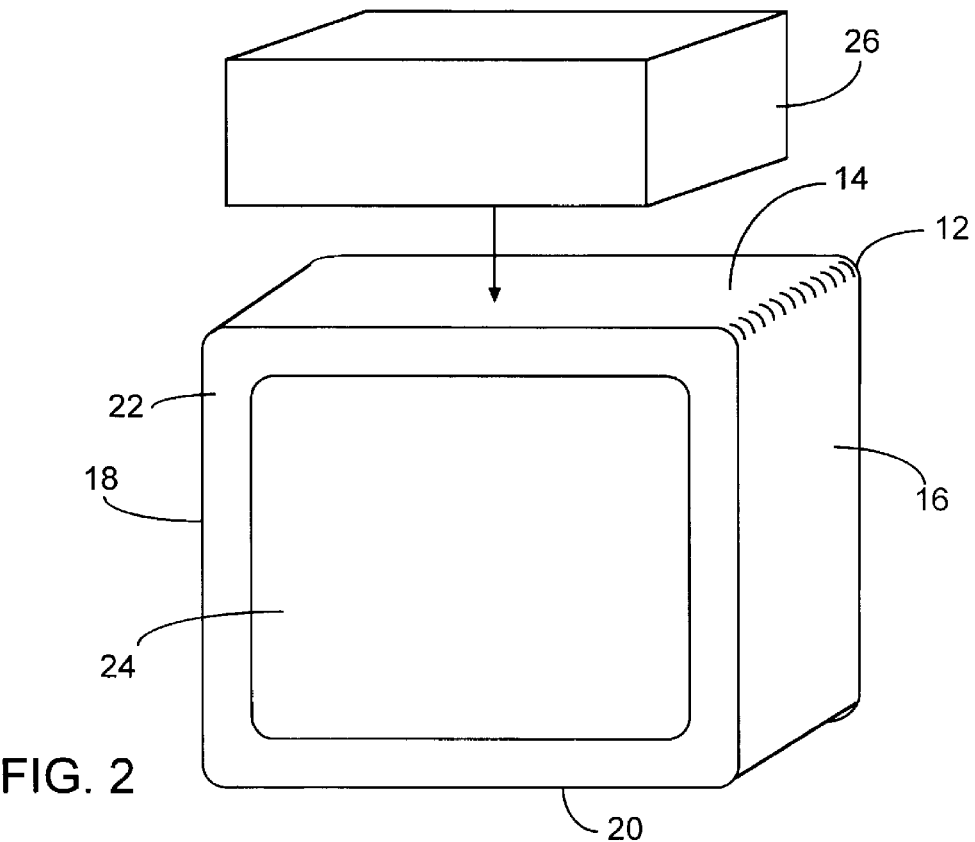
FIG. 2 illustrates the positioning of a three-dimensional object on a display device.

Referring now to FIG. 2 the positioning of a three dimensional (3-D) object 26 on display device 12 is shown. 3-D object 26 represents any 3-D object of any shape, color, size, pattern, or design which can be combined with an image depicted on the display screen 24 to create the complete image. Any number of the 3-D objects 26 can be used, and can also be used in conjunction with one or more of the 2-D objects 10 to form a corresponding number of portions of the complete image. As with the 2-D objects 10, the 3-D objects 26 can be positioned on any one or more sides 14, 16, 18, 20, and 22 of the display device 12 by various attachment or placement mechanisms. The 3-D object 26 is most easily positioned on the display device 12 on the top side 14 by gravitational force.

Figure 3:
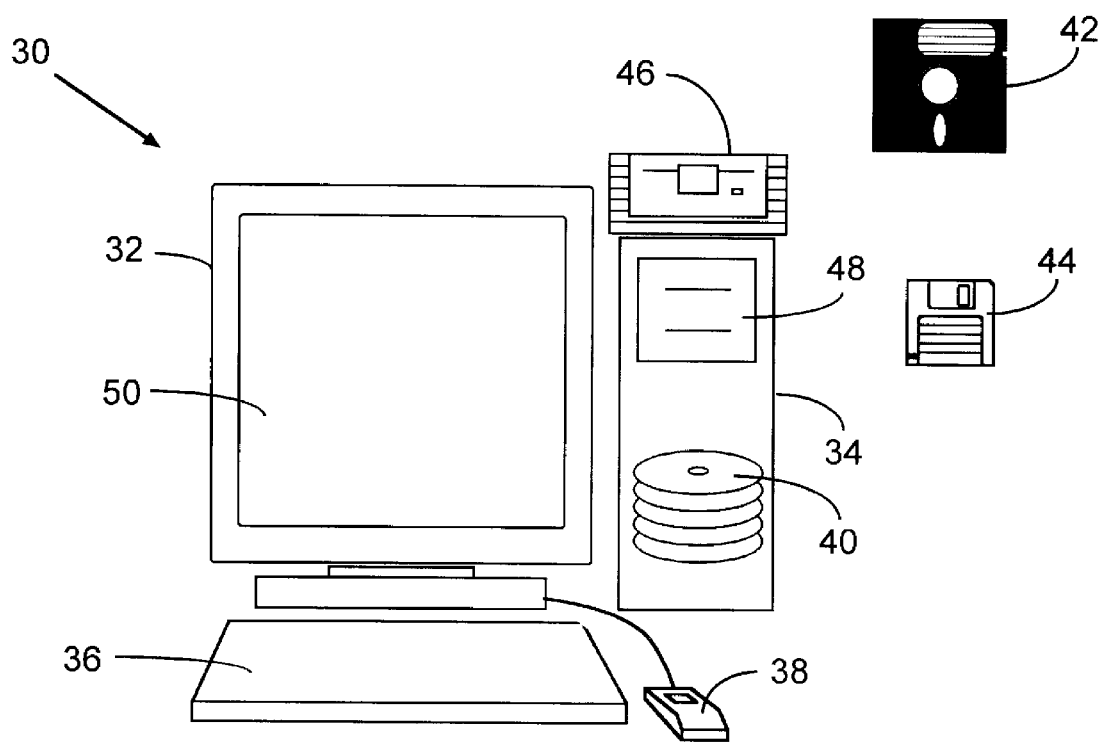
FIG. 3 is a diagram of a computer system used to display a portion of the complete image.

Referring now to FIG. 3, a computer system 30 is shown. Computer system 30 includes a display device such as display device 12 of FIGS. 1 and 2, which can be seen as computer monitor 32 in FIG. 3. Computer system 30 also includes processing system 34, and ordinarily includes user interface devices such as keyboard 36 and pointing device 38. Processing unit 34 typically includes a hard disk 40 which is a magnetic medium for storing data. External storage diskettes 42 and 44 can also store data for use in computer system 30. Diskette drives 46 and 48 allow data to be written to, and read from, diskettes 42 and 44 respectively.

The ability of a processing unit 34 to display electronic depictions on a display screen 50 of computer monitor 32 is known in the art. These electronic depictions can be stored on hard disk 40, diskettes 42 or 44, or in random access memory (RAM) (not shown). The computer monitor 32 is the visual interface between the processing unit 34 and the user, for allowing the user to view the electronic depictions.

Digital graphic images can be created in many ways to be depicted on computer system 30. For instance, drawing programs are available where images are built up from discrete pieces such as lines, curves, triangles, and rectangles. This process is sometimes referred to object-oriented graphics or vector graphics because the whole image is assembled from a collection of objects or vectors. Painting programs are also available which work via bitmapped graphics, where a graphic image is created pixel-by-pixel. Graphic images can also be imported into computer system 30 and stored in the memory of computer system 30 to be displayed when desired. Drawings or photographs can also be scanned using optical scanners which will store an electronic representation of the drawing or photograph in digital form. These various graphics imaging tools allow a user to create nearly any image desired on the display screen 50 of computer system 30.

One popular type of image to be displayed on the display screen 50 is an image generated by a screen saver program. Screen savers were originally devised to protect cathode ray tube (CRT) monitors from being damaged. The phosphor in a CRT can gradually be damaged by electron bombardment where a bright, stationary image is projected on the monitor for a long period of time. A screen saver program prevents the monitor from receiving a stationary image for more than a predetermined amount of time. The predetermined amount of time is typically based on a time in which no input is entered by the user from either the keyboard 36, the pointing device 38, or other user-interface devices. The simplest screen savers automatically remove the bright image from the display screen 50 after a predetermined amount of time. However, screen savers have also become a way of providing computer entertainment or amusement by providing amusing or entertaining images on the display screen after the predetermined time has elapsed.

Figure 4:
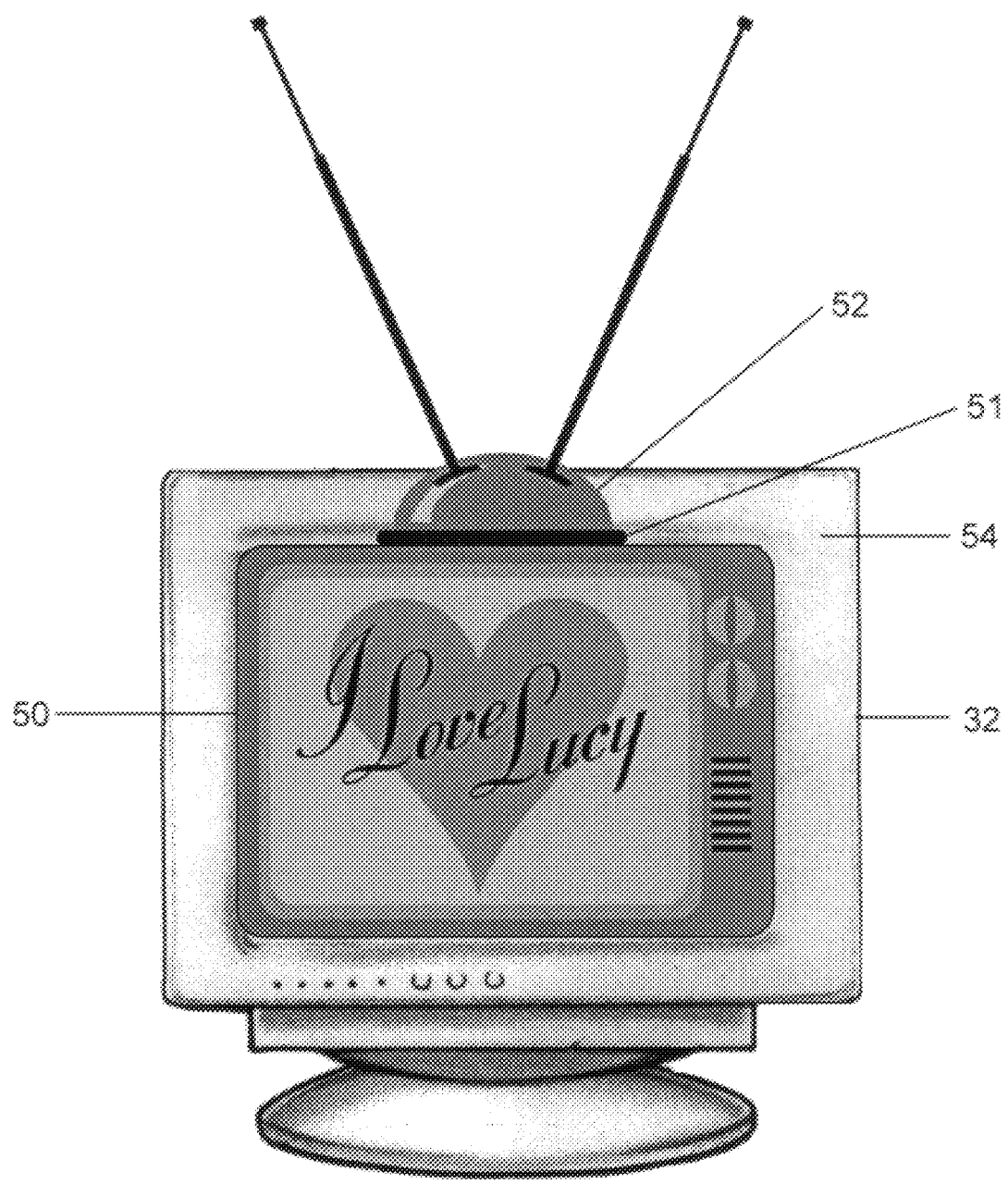
FIG. 4 illustrates one embodiment of the invention where a two-dimensional object creates a continuous visual image with an electronic depiction on a display screen.

Referring now to FIG. 4, one embodiment of the present invention is shown. Computer monitor 32 is shown having an electronic depiction of an old-fashioned television set on the display screen 50. The visual image on display screen 50 is displayed following a predetermined time interval as was previously described for a screen saver program. The visual image can also be displayed without the use of a screen saver program by directly displaying the visual image from stored digital data. This visual image, including the electronically depicted base portion 51, jointly interacts with the physical object 52 to create a continuous, complete visual image. The physical object 52 of FIG. 4 is a substantially two-dimensional representation of an old-fashioned antenna which, when positioned on the front side 54 of computer monitor 32, appears to set atop of the old-fashioned television set displayed on the display screen 50. The base portion 51 is electronically depicted as an extension of the physical object 52.

It should be noted that the display device of FIG. 4 could be other than a computer monitor 32. For instance, the display device can be a television set which receives a broadcast or cable signal and depicts an electronic image in response. Video tapes can also store images to be depicted on the screen of a television. With the advent of high definition television (HDTV) or advanced television (ATV), images could be displayed on a television from other sources such as laserdiscs.

Figure 5:
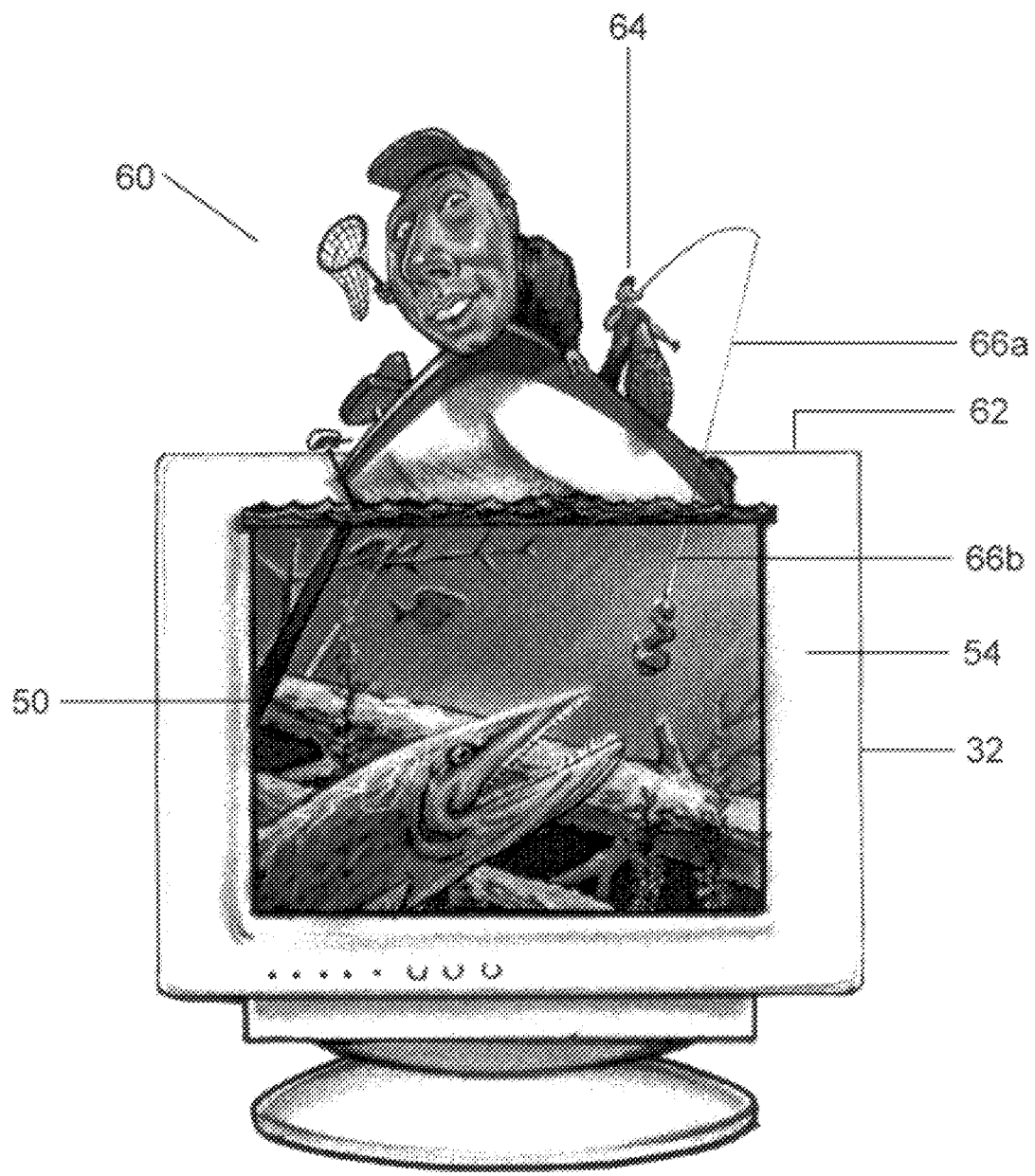
FIG. 5 illustrates another embodiment of the invention where a three-dimensional object creates a continuous visual image with an electronic depiction on a display screen.

Referring now to FIG. 5, another embodiment of the present invention is shown. Object 60 is a three-dimensional object representing a portion of a complete image. Object 60 shows the bow of a boat, and two men fishing from the boat. This three-dimensional object 60 can be attached to the front side 54 of computer monitor 32, or can be positioned on the top side 62. Object 60 can also be a picture created on a substantially two-dimensional surface, and positioned on the front side 54 of the computer monitor 32. Character 64 of object 60 is shown holding a fishing rod, with fishing line 66a extending to a point proximate the display screen 50. This gives the visual impression that character 64 is fishing into the display screen 50 of computer monitor 32.

In order to complete the visual image, an electronic representation of an underwater scene is displayed on display screen 50. Fishing line 66b represents an electronic extension of the physical fishing line 66a of object 60. The interaction between the object 60 and the electronic image on display screen 50 provides a very clear visual connection between the object 60 and the electronic image.

Other embodiments which illustrate the cooperative feature of the invention include a physical object representing a mountain climber on the side 16 or 18 of the monitor 32, the mountain electronically depicted on the display screen 50, where the mountain climber's hands, feet, ropes, etc. being represented as a portion of the visual representation on the display screen 50. Another such example includes a skyline depicted on the display screen 50, where the tops of the buildings are physical objects mounted on the top or the front side of the monitor 32, and where the physical tops of the buildings are an extension, or a continuation, of a visual representation of the remaining portion of the buildings on the display screen 50.

The preferred electronic image displayed on display screen 50 of FIG. 5 is generated by a screen saver program. The computer system 30 (shown in FIG. 3) can detect the passage of a predetermined length of time in which no input by the user is detected. When this time has elapsed, the electronic image shown in FIG. 5 replaces the pre-existing image on the display screen 50.

One advantage of the present invention is the ability to create a complete image that is at least partly animated. A dynamically changing electronic depiction on display screen 50 can greatly enhance the interaction with the physical object 60. For instance, referring again to FIG. 5, the underwater scene on display screen 50 can change with time, so it appears that the fish are swimming, and the vegetation is swaying with the waves. The fishing line 66b bobs up and down as the fish float by, or even take the bait. A multitude of such scenarios can be envisioned.

In another embodiment of the invention, the computer system 30 includes within any of its data storage mediums (hard disk 40, diskettes 42 or 44, RAM, ROM, etc.) an electronic representation of both the image on the display screen 50, and an electronic image of the one or more physical objects. The image therefore can optionally be completely represented on the display screen 50. This allows a user to view the complete image where the physical objects are not present, for example, when used with a mobile laptop computer where the physical objects will not be utilized. This option is preferably executed via a toggle function executed by computer system 30, which allows for toggling between the visual representation and a unified visual representation on the display of the monitor. The unified visual representation wholly defines the image by including the visual representation and an electronic depiction of the physical objects.

Where computer system 30 includes audio capabilities, sound can also be included to present an even more realistic experience. For instance, referring to FIG. 5, the sound of water splashing, a boat motor, a fish swallowing the bait, and the fishermen's voices are to name but a few.

The invention is susceptible to various modifications, modes of operation and embodiments. Accordingly, what is intended to be protected by Letters Patents is to be limited only in accordance with the appended claims.

What is claimed is:

1. A partially computerized combination for depicting an image in a system having a monitor coupled to a computer, comprising:

a set of one or more physical objects, each physical object positioned on a side of the monitor and representing a different discrete portion of the image, each discrete portion visibly connected to a remaining portion of the image; and means, implemented by the computer, for displaying the remaining portion of the image as a visual representation on a display of the monitor, at least a portion of the visual representation being a visual extension of one or more of the physical objects, wherein the visual representation, the visual extension, and the set of one or more physical objects jointly define the image.

2. The combination of claim 1, wherein each physical object of a subset of the set of physical objects is two-dimensional (2-D) in nature.

3. The combination of claim 1, wherein at least one of the physical objects is three-dimensional (3-D) in nature.

4. The combination of claim 1, wherein the remaining portion of the image is static, the visual representation of the remaining portion of the image not changing over time.

5. The combination of claim 1, wherein the remaining portion of the image is animated, the visual representation of the remaining portion of the image changing over time.

6. The combination of claim 1, wherein at least one of the physical objects is positioned on a top side of the monitor by the force of gravity.

7. The combination of claim 1, wherein the means for displaying the remaining portion of the image as a visual representation on the display of the monitor further comprises means for detecting a passage of a predetermined length of time in which no input by a user of the computer is detected before displaying the remaining portion of the image as a visual representation on the display of the monitor.

8. The combination of claim 1, further comprising means, implemented by the computer, for toggling between the visual representation and a unified visual representation on the display of the monitor, the unified visual representation wholly defining the image by including the visual representation and an electronic depiction of the set of one or more physical objects.

9. A partially computerized method for depicting an image in a system having a monitor coupled to a computer, comprising the steps of:

positioning a set of one or more physical objects on a side of the monitor, each physical object representing a different discrete portion of the image, each discrete portion creating a continuous visual image with a remaining portion of the image; and displaying the remaining portion of the image as a visual representation on a display of the monitor, at least a portion of the visual representation being a visual extension of one or more of the physical objects, wherein the visual representation, the visual extension, and the set of one or more physical objects jointly define the image.

10. The method of claim 9, wherein the displaying step comprises the step of displaying the remaining portion of the image as a static visual representation not changing over time.

11. The method of claim 9, wherein the displaying step comprises the step of displaying the remaining portion of the image as an animated visual representation changing over time.

12. The method of claim 9, wherein the positioning step comprises the step of positioning at least one of the physical objects on a top side of the monitor by the force of gravity.

13. The method of claim 9, wherein the displaying step comprises the step of detecting a passage of a predetermined length of time in which no input by a user of the computer is detected before displaying the remaining portion of the image as a visual representation on the display of the monitor.

14. The combination of claim 9, further comprising the step of toggling between the visual representation and a unified visual representation on the display of the monitor, the unified visual representation wholly defining the image by including the visual representation and an electronic depiction of the set of one or more physical objects.

15. A partially computerized system for depicting an image nearly seamlessly, comprising:

a computer;

a monitor, operably connected to the computer, the monitor having a display;

a set of one or more physical objects, each physical object positioned on a side of the monitor and representing a different discrete portion of the image, each discrete portion creating a virtual visual connection with a remaining portion of the image; and means, implemented by the computer, for displaying the remaining portion of the image as a visual representation on the display of the monitor, at least a portion of the visual representation being a visual extension of one or more of the physical objects, wherein the visual representation and the set of one or more physical objects jointly define the image.

16. The system of claim 15, wherein at least one of the physical objects is two-dimensional (2-D) in nature.

17. The system of claim 15, wherein at least one of the physical objects is three-dimensional (3-D) in nature.

18. The system of claim 15, wherein the remaining portion of the image is static, the visual representation of the remaining portion of the image not changing over time.

19. The system of claim 15, wherein the remaining portion of the image is animated, the visual representation of the remaining portion of the image changing over time.

20. The system of claim 15, further comprising means, implemented by the computer, for toggling between the visual representation and a unified visual representation on the display of the monitor, the unified visual representation including the visual representation and an electronic depiction of the set of one or more physical objects.

21. A combination for depicting an image, comprising:

a display device;

a set of one or more physical objects, each physical object positioned on a side of the display device and representing a different discrete portion of the image, each discrete portion being visibly united with a remaining portion of the image; and means for displaying the remaining portion of the image as a visual representation on the display device, at least a portion of the visual representation being a visual extension of one or more of the physical objects, wherein the visual representation, the visual extension, and the set of one or more physical objects together define the image.

22. The combination of claim 21, wherein at least one of the physical objects is two-dimensional (2-D) in nature.

23. The combination of claim 21, wherein at least one of the physical objects is three-dimensional (3-D) in nature.

24. The combination of claim 21, wherein the remaining portion of the image is static, the visual representation of the remaining portion of the image not changing over time.

25. The combination of claim 21, wherein the remaining portion of the image is animated, the visual representation of the remaining portion of the image changing over time.

26. The combination of claim 21, wherein the display device is a television.

27. The combination of claim 21, wherein the display device is a video terminal.

28. An image depicting kit capable of being assembled to depict an image at a computer having a display terminal, the kit comprising the combination of:

a set of one or more physical objects adapted to be positioned to a side of the display terminal, each of the physical objects representing a different discrete element of a portion of the image and being visibly connected to a remaining portion of the image; and a computer readable storage medium having a computer readable program code means capable of being executed by the computer embodied thereon, the computer readable program code means for displaying the remaining portion of the image as a visual representation on a display screen of the display terminal, at least a portion of the visual representation being a visual extension of one or more of the physical objects, wherein the visual representation, the visual extension, and the set of one or more physical objects jointly define the image.

29. The image depicting kit of claim 28, wherein at least one of the physical objects is two-dimensional (2-D) in nature.

30. The image depicting kit of claim 28, wherein at least one of the physical objects is three-dimensional (3-D) in nature.

31. The image depicting kit of claim 28, wherein the computer readable program code means comprises means for displaying the remaining portion of the image as a static visual representation not changing over time.

32. The image depicting kit of claim 28, wherein the computer readable program code means comprises means for displaying the remaining portion of the image as an animated visual representation changing over time.

33. The image depicting kit of claim 28, wherein the computer readable program code means further comprises means for detecting a passage of a predetermined length of time in which no input by a user of the computer is detected before displaying the remaining portion of the image as a visual representation on the display screen of the display terminal.

34. The image depicting kit of claim 28, wherein the computer readable program code means further comprises means for toggling between the visual representation and a unified visual representation on the display screen of the display terminal, the unified visual representation wholly defining the image by including the visual representation and an electronic representation of the set of one or more physical objects.

35. The image depicting kit of claim 28, further comprising instructional materials describing the use of the set of one or more physical objects and the computer readable storage medium.

* * * * *